Nov. 12, 1957     A. L. McGEE     2,812,773

LIQUID CONTROL APPARATUS

Filed Dec. 14, 1954     2 Sheets-Sheet 1

INVENTOR.
ALBERT L. McGEE
BY
Christie, Parker & Hale
ATTORNEYS

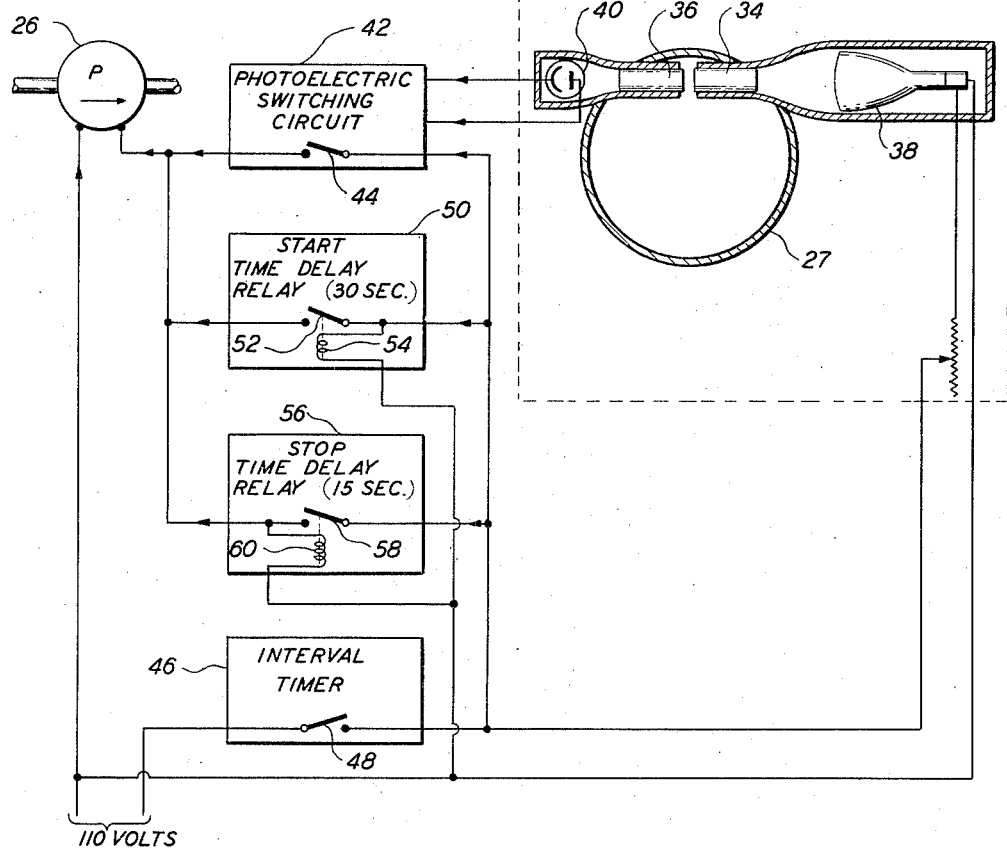

United States Patent Office 2,812,773
Patented Nov. 12, 1957

2,812,773

LIQUID CONTROL APPARATUS

Albert L. McGee, Chehalis, Wash., assignor to Process Engineers Incorporated, San Mateo, Calif., a corporation of California Application December 14, 1954, Serial No. 475,185

9 Claims. (Cl. 137—487.5)

This invention relates to apparatus for controlling the flow of a liquid through a conduit, and it has particular reference to apparatus for controlling the flow of sludge in accordance with the density of the solids in the sludge.

In many sedimentation operations sludge is allowed to settle out of a pool of liquid under a cover of supernatant liquid until it accumulates in sufficient quantity and density to justify withdrawal. Then it is removed in a batch until the supernatant liquid begins to come through or until the density of the solids in the sludge is reduced substantially.

This practice is common in sewage treatment where most of the solids are removed from the liquid portion of the sewage in a primary settling tank and then the solids in the form of sludge are transferred to a sludge digester for further treatment. It is desirable to transfer only thick sludge to the digester so as to reduce the amount of liquid which must be handled by the sludge digester.

I have found that the density of the sludge which is transferred from the primary settling tank to the sludge digester can be controlled effectively by transferring the sludge during spaced intervals of time and by employing photoelectric control apparatus to stop the transfer in the event that the density of the solids in the sludge is reduced to a certain amount. In this way, only the heavy sludge is removed from the primary settling tank, and the transfer is stopped when the density of the solids in the sludge is reduced to some selected percentage.

At the beginning of each transfer of sludge, the first discharge is relatively clear liquid due to the settling of solids during the period of time between successive transfers. In order to prevent the photoelectric control apparatus from stopping the transfer due to the low density of solids, I provide a time delay device which maintains the transfer of liquid for a short period of time independently of the action of the photoelectric control.

Preferably, a second time delay device is provided to maintain the transfer of sludge for a short period of time after the photoelectric control apparatus operates to stop the transfer, so as to avoid the effects of temporary reductions in the density of the solids in the sludge.

The invention is explained in more detail with reference to the drawings, in which:

Fig. 2 is a diagram showing the control apparatus of the invention; and

Figure 1:
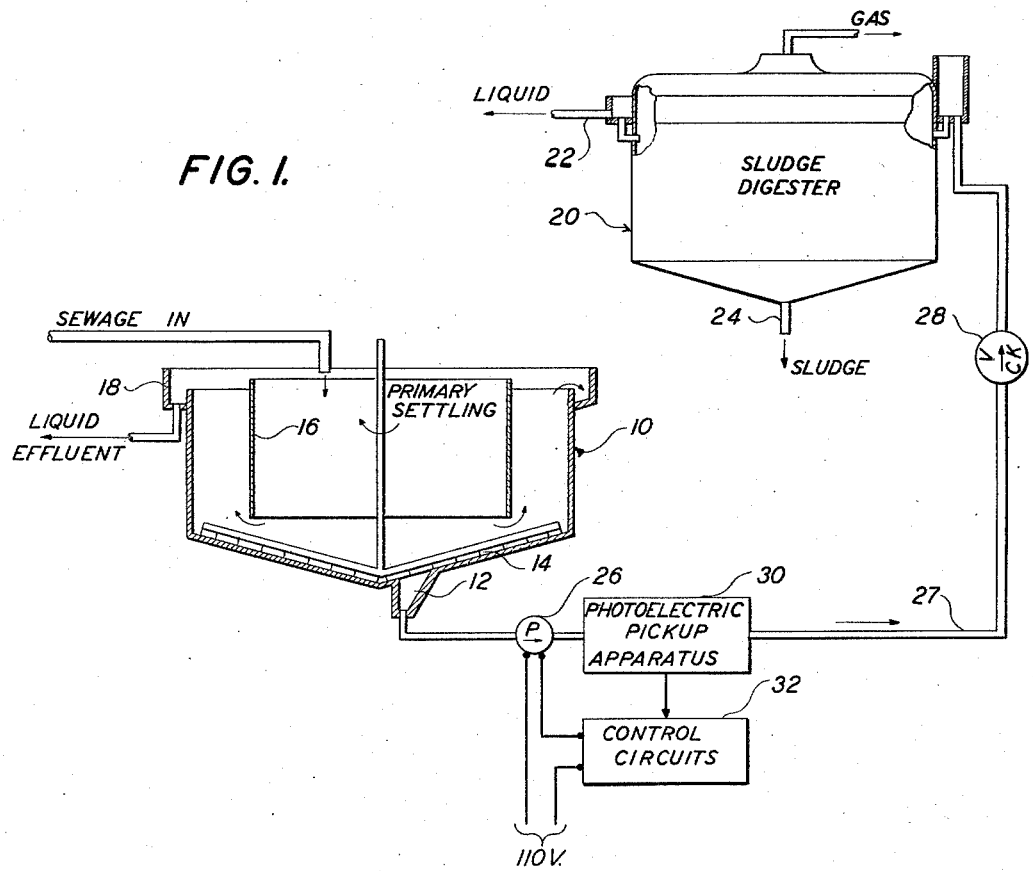
Fig. 1 shows the control apparatus of the present invention employed in a sewage treatment system.

Fig. 1 shows a simple sewage treatment arrangement wherein the sewage is first treated in a primary settling tank 10 which comprises a round tank with a gently sloping frusto-conical bottom. A sludge sump 12 is located near the center of the bottom of the primary settling tank, and slowly rotating rakes 14 push the settled solids in spiral paths into the sump.

An annular baffle 16 is located in the tank, and clarified liquid effluent moves upwardly between the baffle and the outer wall of the clarifier until it discharges into a peripheral launder 18. The liquid effluent which is removed from the launder is substantially free from solids due to the settling action in the primary settling tank.

The sludge which accumulates in the sump 12 is transferred to a sludge digester 20 which serves to treat the sludge further and also serves to separate the liquid from the solids. The liquid is removed through a conduit 22 and the treated sludge is removed through another conduit 24.

In order to reduce the volume of liquid which must be processed by and discharged from the sludge digester, it is desirable to transfer only thick sludge to the sludge digester.

In the arrangement shown in Fig. 1, the sludge is transferred from the sump 12 to the sludge digester by an electric pump 26, and a check valve 28 is located in the conduit 27 between the pump and the sludge digester for preventing backflow of the sludge.

Photoelectric pickup apparatus 30 is coupled to the conduit 27 between the pump and the check valve for providing an electrical signal representative of the density of the solids in the sludge, and the output of the photoelectric pickup apparatus is employed to control the action of the control circuits 32 which control the action of the pump in accordance with the density of the solids in the sludge.

Fig. 2 shows the circuit arrangement for the photoelectric pickup apparatus and the control circuits which are shown in block form in Fig. 1.

The photoelectric pickup apparatus comprises a pair of Lucite rods 34 and 36 having spaced ends located in the conduit 27 so that the sludge can pass between the ends of the Lucite rods to control the amount of light which is transmitted between them. A reflector lamp 38 serves to direct light into the Lucite rod 34. A photoelectric cell 40 responds to the light which is transmitted through the liquid in the conduit 27 to the Lucite rod 36.

The output of the photoelectric cell is applied to a photoelectric switching circuit 42 which serves to cause a switch 44 to remain closed as long as the density of the solids in the sludge exceeds a predetermined amount.

An interval timer 46 serves to provide electric power through a switch 48 during selected intervals of time. By way of example, the interval timer may be arranged to provide electric power during 10 minutes out of each hour of a 24-hour day.

The switch 44 of the photoelectric switching circuit is connected between the switch 48 of the interval timer and the pump, so that the photoelectric switching circuit serves to provide power to the pump during the intervals of time which are selected by the interval timer provided the density of the solids in the sludge exceeds a selected amount throughout these intervals of time. If the density of the solids in the sludge is reduced below the selected amount during any of the intervals of time, the switch 44 of the photoelectric switching circuit opens and this turns off the power to the pump.

Since some of the solids settle in the conduits and in the pump during each period of time between pumping intervals so that the initial portion of the liquid is relatively clear, it is desirable to provide some arrangement for preventing turn-off of the pump due to this condition. A start time delay relay 50 having a switch 52 connected in shunt with the switch 44 of the photoelectric switching means is provided to prevent such turn-offs at the start of each pumping period. The winding 54 for this time delay relay is connected to receive power which is provided by the interval timer so that the start time delay relay is activated when power is initially provided by the interval timer. The time delay period is adjusted so that the pump is energized long enough to cause all of the clear liquid to move beyond the photoelectric pickup apparatus before the start time delay relay switch 52 opens. By way of example, the start time delay relay may be adjusted to provide a time delay of 30 seconds after power is initially provided by the interval timer.

A stop time delay relay 56 serves to provide power to the pump for a short period of time, say 15 seconds, after the switch 44 of the photoelectric switching circuit opens. The stop time delay relay has a switch 58 which is connected in shunt with the switch 44 of the photoelectric switching circuit, and it has a winding 60 which is connected to receive power which is provided through the switch 44 of the photoelectric switching circuit.

The stop time delay relay 56 serves to apply electric power to the pump even though the density of the solids in the sludge is temporarily reduced for a brief period of time, thereby avoiding undesired stopping and starting of the pump. Temporary reductions in the density of the solids in the sludge may be caused by back-flushing due to debris clogging a check valve, such as the check valve 28 of Fig. 1.

The stop time delay relay 56 may be omitted if it is unlikely that temporary reductions of solids in the sludge will occur. Even if temporary reductions of the solids do occur, the stop time delay relay may be omitted if recurrent stopping and starting of the pump are not objectionable.

Interval timers, photoelectric switching circuits, and time delays relays are well known in the art and hence are not disclosed in detail here.

Figure 3:
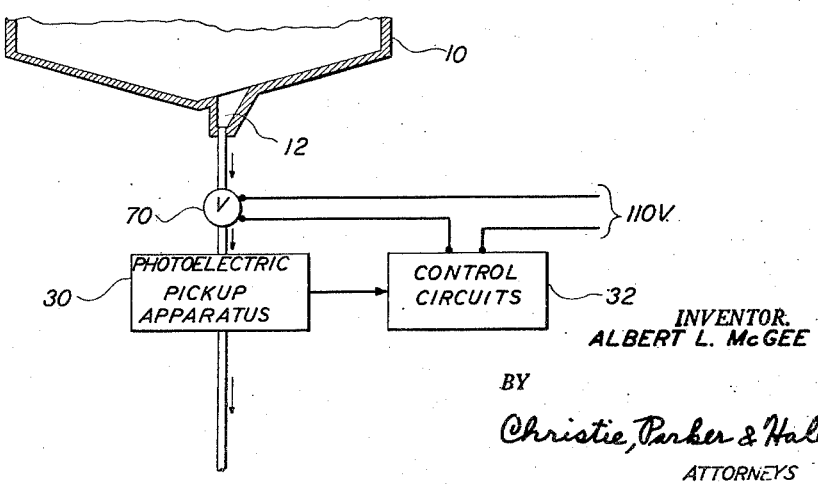
Fig. 3 shows how the control apparatus of the invention may be employed to control the flow of a liquid through a valve.

Fig. 3 illustrates how the control apparatus of the present invention may be employed to control the flow of a liquid by gravity drain through a valve.

In the arrangement illustrated, the flow of sludge from the sump 12 is controlled by a solenoid-actuated valve 70. The photoelectric pickup apparatus 30 and the control circuit 32 may be the same as those disclosed in Fig. 2. The control apparatus functions in the same manner as discussed above with reference to Figs. 1 and 2 with the exception that a valve instead of a pump is employed to control the flow of sludge.

In the apparatus of Fig. 3, temporary reductions in the density of the solids in the sludge would be unlikely and the stop time delay relay 56 of Fig. 2 may be omitted if desired.

Although the invention has been explained with reference to controlling the flow of sludge in a sewage-treating system, it will be apparent that the control apparatus of the present invention may be employed to control the flow of substantially any liquid which has opaque matter in it.

In the specification and the appended claims I use the term "electric pump" to means a pump driven by electrical power. Similarly, I employ the term "electric valve" to means a valve actuated by electrical power, for example a valve with its plug connected to a solenoid. Both the electric valves and the electric pumps are encompassed in the term "electrical control apparatus" for controlling the flow of liquid through a conduit.

I claim:

1. In a device having electrical control apparatus for controlling the flow of a liquid through a conduit, an interval timer for providing electric power during selected intervals of time, photoelectric pickup means coupled to the conduit for providing an electrical signal representative of the density of solids in the liquid, switching means responsive to the output of the photoelectric pickup means and connected between the interval timer and the electrical control apparatus for providing power to the electrical control apparatus during each period of time within said selected intervals of time during which the density of the solids in the liquid exceeds a predetermined amount, means coupled between the interval timer and the electrical control apparatus for providing power to the electrical control apparatus for a predetermined period of time when power is initially applied from the interval timer to the photoelectric switching means coupled between the interval timer and the electrical control apparatus, and means for providing power to the electrical control apparatus for a predetermined period of time each time that the flow of power through the photoelectric switching means is interrupted, so as to avoid the effects of temporary reductions in the density of the solids in the liquid upon the electric power being applied to the electrical control apparatus.

2. The apparatus of claim 1 wherein the electrical control apparatus is an electric pump.

3. The apparatus of claim 1 wherein the electrical control apparatus is an electric valve.

4. In a device having electrical control apparatus for controlling the flow of a liquid through a conduit, photoelectric pickup means coupled to the conduit for providing an electrical signal representative of the density of solids in the liquid, switching means responsive to the output of the photoelectric pickup means for providing power to the electrical control apparatus during periods of time in which the density of the solids in the liquid exceeds a predetermined amount, a first time delay switching means coupled to the electrical control apparatus and to the photoelectric switching means for providing power to the electrical control apparatus for a predetermined period of time when power is initially applied to the photoelectric switching means, and a second time delay switching means coupled to the electrical control apparatus and to the photoelectric switching means for providing power to the electrical control apparatus for a predetermined period of time each time that the flow of power through the photoelectric switching means is interrupted, so as to avoid the effects of temporary reduction in the density of the solids in the liquid upon the electric power being applied to the electrical control apparatus.

5. In a device having electrical control apparatus for controlling the flow of a liquid through a conduit, an interval timer for providing electric power during selected intervals of time, photoelectric pickup means coupled to the conduit for providing an electrical signal representative of the density of the solids in the liquid, switching means responsive to the output of the photoelectric pickup means and connected between the interval timer and the electrical control apparatus for providing power to the electrical control apparatus during each period of time within said selected intervals of time during which the density of the solids in the liquid exceeds a predetermined amount, and means coupled between the interval timer and the electrical control apparatus for providing power to the electrical control apparatus for a predetermined period of time when power is initially applied from the interval timer to the photoelectric switching means.

6. In apparatus having an electric pump for pumping sludge through a conduit, photoelectric pickup means coupled to the conduit for providing an electrical signal representative of the density of the solids in the sludge, an interval timer for providing electric power during selected intervals of time, switching means responsive to the output of the photoelectric pickup means and connected between the interval timer and the pump for providing power to the pump during each period of time within said selected intervals of time during which the density of the solids in the sludge exceeds a predetermined amount, a first time delay switching means coupled between the interval timer and the pump for providing power to the pump for a predetermined period of time when power is initially provided by the interval timer so as to cause the pump to move a portion of the sludge through the conduit independently of the action of the photoelectric switching means, and a second time delay switching means coupled between the interval timer and the pump for providing power to the pump for a predetermined period of time each time that the flow of power through the photoelectric means is interrupted, so as to avoid the effects of temporary reductions in the density of the solids in the sludge upon the electric power being applied to the pump.

7. In apparatus having an electric pump for pumping sludge through a conduit, photoelectric pickup means including a pair of Lucite rods having spaced ends located in the conduit for providing an electrical signal representative of the density of the solids in the sludge which passes between the spaced ends of the Lucite rods, an interval timer for providing electric power during selected intervals of time, switching means responsive to the output of the photoelectric pickup means and connected between the interval timer and the pump for providing power to the pump during each period of time within said selected intervals of time during which the density of the solids in the sludge exceeds a predetermined amount, a first time delay switching means coupled between the interval timer and the pump and responsive to the power provided by the interval timer for providing power to the pump for a predetermined period of time when power is initially provided by the interval timer so as to cause the pump to move a portion of the sludge through the conduit independently of the action of the photoelectric switching means, and a second time delay switching means coupled between the interval timer and the pump and responsive to the power provided to the pump through the photoelectric switching means for providing power to the pump for a predetermined period of time each time that the flow of power through the photoelectric means is interrupted, so as to avoid the effects of temporary reductions in the density of the solids in the sludge upon the electric power being applied to the pump.

8. In apparatus having an electric pump for pumping sludge through a conduit, photoelectric pickup means coupled to the conduit for providing an electrical signal representative of the density of the solids in the sludge, an interval timer for providing electric power during selected intervals of time, switching means responsive to the output of the photoelectric pickup means and connected between the interval timer and the pump for providing power to the pump during each period of time within said selected intervals of time during which the density of the solids in the sludge exceeds a predetermined amount, and time delay switching means coupled between the interval timer and the pump for providing power to the pump for a predetermined period of time when power is initially provided by the interval timer so as to cause the pump to move a portion of the sludge through the conduit independently of the action of the photoelectric switching means.

9. In apparatus having an electric pump for pumping a liquid through a conduit, photoelectric pickup means coupled to the conduit for providing an electrical signal representative of the density of solids in the liquid, switching means responsive to the output of the photoelectric pickup means for providing power to the pump during each period of time during which the density of the solids in the liquid exceeds a predetermined amount, a first time delay switching means coupled to the pump for providing power to the pump for a predetermined period of time when power is initially applied to the photoelectric switching means so as to cause the pump to move a portion of the liquid through the conduit independently of the action of the photoelectric switching means, and a second time delay switching means coupled to the pump for providing power to the pump for a predetermined period of time each time that the flow of power through the photoelectric switching means is interrupted, so as to avoid the effects of temporary reductions in the density of the solids in the liquid upon the electric power being applied to the pump.

References Cited in the file of this patent

UNITED STATES PATENTS

| | | |
|---|---|---|
| 2,044,164 | Gulliksen | June 16, 1936 |
| 2,147,422 | Bendz | Feb. 14, 1939 |
| 2,204,225 | Merckel | June 11, 1940 |
| 2,295,366 | Stout | Sept. 8, 1942 |
| 2,461,592 | De Brabander | Feb. 15, 1949 |
| 2,707,440 | Long et al. | May 3, 1955 |
| 2,725,196 | Trittschuk | Nov. 29, 1955 |